(12) United States Patent
Wakizaka

(10) Patent No.: US 7,400,603 B1
(45) Date of Patent: Jul. 15, 2008

(54) CELLULAR SYSTEM AND COMMUNICATION METHOD ACCORDING TO MULTI-CODE CDMA

(75) Inventor: Yoshiki Wakizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 930 days.

(21) Appl. No.: 10/031,344

(22) PCT Filed: Jul. 21, 2000

(86) PCT No.: PCT/JP00/04901

§ 371 (c)(1),
(2), (4) Date: May 10, 2002

(87) PCT Pub. No.: WO01/08433

PCT Pub. Date: Feb. 1, 2001

(30) Foreign Application Priority Data

Jul. 22, 1999 (JP) .................................. 11-207272

(51) Int. Cl.
*H04Q 7/00* (2006.01)
(52) U.S. Cl. .................. 370/332; 370/335; 370/342; 370/437; 455/452.2; 455/453
(58) Field of Classification Search ......... 370/331–333, 370/334, 320, 335, 441, 216, 242, 225–228, 370/329, 339, 348, 431, 437, 230, 235, 237, 370/322, 328, 342, 395.2, 395.21, 462, 479, 370/323; 375/130, 141, 144, 146, 147, 148, 375/285, 346, 296; 455/509, 63.4, 123, 450, 455/451, 455, 456.2, 456.5, 456.6, 13.3, 455/8, 464, 33.1, 33.2, 33.4, 50.1, 54.1, 56.1, 455/62, 436, 439, 452.1, 452.2, 453
See application file for complete search history.

(56) References Cited

U.S. PATENT DOCUMENTS 5,210,540 A 5/1993 Masumoto
5,442,625 A * 8/1995 Gitlin et al. .................. 370/342
5,513,379 A * 4/1996 Benveniste et al. .......... 455/451
5,678,178 A * 10/1997 Tahkokorpi .............. 455/452.1
5,734,646 A * 3/1998 I et al. ......................... 370/335
6,061,018 A 5/2000 Sheynblat
6,151,512 A * 11/2000 Chheda et al. ........... 455/562.1
6,307,850 B1 10/2001 Watanabe .................... 370/335
6,552,681 B1 4/2003 Hayward et al.
2003/0084838 A1 5/2003 Zhao

FOREIGN PATENT DOCUMENTS

| EP | 0 684 744 A2 | 11/1995 |
|---|---|---|
| JP | 6-121 371 | 4/1994 |
| JP | 6-121371 | 4/1994 |
| JP | 06121371 A * | 4/1994 |

(Continued)

*Primary Examiner*—Chi Pham
*Assistant Examiner*—Donald L Mills
(74) *Attorney, Agent, or Firm*—Foley & Lardner LLP

(57) ABSTRACT

A cellular system in accordance with the present invention includes at least two base stations, a mobile station making communication with the base stations in multi-code CDMA, and an host station controlling communication made between the base stations and the mobile station. When one of the base stations becomes saturated, the mobile station makes communication in multi-code CDMA through a channel of other base station(s).

8 Claims, 3 Drawing Sheets

| FOREIGN PATENT DOCUMENTS | | |
|---|---|---|
| JP | 8-274687 | 10/1996 |
| JP | 8-307 928 | 11/1996 |
| JP | 8-307928 | 11/1996 |
| JP | 9-162799 | 6/1997 |
| JP | 9-200115 | 7/1997 |
| JP | 10-190626 | 7/1998 |
| JP | 10-294716 | 11/1998 |
| JP | 10-308972 | 11/1998 |
| JP | 11-74820 | 3/1999 |
| JP | 11074820 A * | 3/1999 |
| JP | 2001-36964 | 2/2001 |

* cited by examiner

CELLULAR SYSTEM AND COMMUNICATION METHOD ACCORDING TO MULTI-CODE CDMA

BACKGROUND OF THE INVENTION

1. Field of the Invention

The invention relates to a cellular system and a method of making communication in multi-code CDMA both of which are capable of effectively using channels of a base station or base stations in multi-code CDMA (Code Division Multiple Access) communication.

2. Description of the Related Art

There have been suggested many mobile communication apparatuses or systems operating in CDMA. For instance, Japanese Unexamined Patent Publication No. 8-274687 has suggested a CDMA wireless communication system, Japanese Unexamined Patent Publication No. 9-200115 has suggested a method of controlling directivity of an antenna in a radio-station in CDMA wireless communication system, Japanese Unexamined Patent Publication No. 10-190626 has suggested a CDMA receiver, Japanese Unexamined Patent Publication No. 10-308972 has suggested a CDMA cellular system, and Japanese Unexamined Patent Publication No. 11-74820 has suggested a CDMA signal receiver.

When a mobile communication system operating in CDMA transmits data at a rate greater than a data transmission rate per one channel (one diffusion sign), it generally transmits data in multi-code transmission where it assigns a plurality of channels, that is, a plurality of diffusion signs to a user, and transmits data through a plurality of channels.

However, a conventional mobile communication system operating in multi-code CDMA is accompanied with the following two problems.

The first problem is that when high-rate communication is to be made in multi-code, if it is not possible to secure channels of a base station for all codes, the system cannot provide services to a mobile station.

The second problem is that when high-rate communication is to be made in multi-code, it would be necessary to increase the number of channels in a base station in order to provide a high connection ratio to a mobile station, resulting in that a base station could not be constructed in a small size.

SUMMARY OF THE INVENTION

In order to solve the above-mentioned problems in the conventional mobile communication system operating in multi-code CDMA, it is an object of the present invention to provide a cellular system operating in multi-code CDMA and a method of making communication in multi-code CDMA both of which are capable of effectively using channels of a base station, when high-rate communication is to be made in multi-code CDMA.

In one aspect of the present invention, there is provided a cellular system including at least two base stations, a mobile station making communication with the base stations in multi-code CDMA, and an host station controlling communication made between the base stations and the mobile station, wherein the mobile station, when channels of a base station with which the mobile station makes multi-code CDMA communication are saturated, stops a part of the communication, and makes the thus stopped part of the communication with other base station(s).

In the cellular system in accordance with the present invention, if channels of a base station are saturated while a mobile station is making multi-code CDMA communication with the base station, communication between the mobile station and the base station is partially stopped. A part of the stopped communication is made through the mobile station and other base station(s). Thus, the mobile station can continue making communication in multi-code CDMA with the base station through channels of other base station(s), for instance, a base station located adjacent to the base station.

If channels of a base station with which a mobile station is making communication in multi-code CDMA are saturated, it was impossible in the conventional cellular system to continue making communication in multi-code CDMA in a mobile station and a base station. In contrast, even in the same case, the present invention makes it possible to continue making communication in multi-code CDMA between a mobile station and a base station through channels of other base station(s).

It is preferable that the one of the base station(s) and the other base station(s) have an adaptive array antenna.

Since an adaptive array antenna has high directivity, even if a mobile station is located in an area where channels of the above-mentioned other base station(s) generally cannot be assigned to a mobile station, it would be possible to assign channels to the mobile station.

There is further provided a cellular system including at least two base stations, a mobile station making communication with the base stations in multi-code CDMA, and an host station controlling communication made between the base stations and the mobile station, wherein one of the base stations, on receipt of a request of starting communication in n codes (n is an integer equal to or greater than 2) from the mobile station, checks whether channels are short, and transmits the result of checking to the host station, the host station receives the result from the one of the base stations, and, if channels for n codes can be secured, instructs the one of the base stations to start making communication, whereas if channels for m codes (m is an integer smaller than n (m<n)) can be secured, instructs the one of the base stations to start making communication in m codes and further instructs other base station(s) to start making communication in (n−m) codes, and the mobile station makes communication with the one of the base stations in m codes, and further makes communication with the other base station(s) in (n−m) codes.

In the cellular system in accordance with the present invention, a base station, on receipt of a request to start making communication in n codes, judges whether it is possible to secure channels covering n codes. If possible, the base station makes communication in n codes with a mobile station. If not possible, the base station counts the number of codes the base station can secure. For instance, if the base station can secure m codes, the mobile station makes communication in m codes with the base station, and further makes communication in (n−m) codes with other base station(s). That is, the mobile station makes communication with two base stations in totally n codes.

In the cellular system in accordance with the present invention, even if channels of a base station are saturated while a mobile station is making multi-code CDMA communication with the base station, the mobile station can continue making communication in multi-code CDMA with the base station through channels of other base station(s), for instance, a base station located adjacent to the base station.

If channels of a base station with which a mobile station is making communication in multi-code CDMA are saturated, it was impossible in the conventional cellular system to continue making communication in multi-code CDMA in a mobile station and a base station. In contrast, even in the same case, the present invention makes it possible to continue making communication in multi-code CDMA between a mobile station and a base station through channels of other base station(s).

It is preferable that the one of the base stations stops multi-code communication made with a mobile station only in a part of codes, when the one of the base stations receives a request of starting communication from another mobile station and judges that channels is short for satisfying the request, and transmits a request to the host station to make communication with other base station(s) in codes equal to the stopped codes, the host station, on receipt of the request to make communication with other base station(s), instructs a base station other than the one of the base stations to start making communication with the one of the base stations in codes equal to the stopped codes, and the mobile station stops communication made with the one of the base stations in the part of codes, and starts making communication with the base station other than the one of the base stations in codes equal to the stopped codes.

In the cellular system in accordance with the present invention, if channels of a base station are saturated while a mobile station is making multi-code CDMA communication with the base station, communication between the mobile station and the base station is partially stopped. A part of the stopped communication is made through the mobile station and other base station(s). Thus, the mobile station can continue making communication in multi-code CDMA with the base station through channels of other base station(s), for instance, a base station located adjacent to the base station.

If channels of a base station with which a mobile station is making communication in multi-code CDMA are saturated, it was impossible in the conventional cellular system to continue making communication in multi-code CDMA in a mobile station and a base station. In contrast, even in the same case, the present invention makes it possible to continue making communication in multi-code CDMA between a mobile station and a base station through channels of other base station(s).

It is preferable that the one of the base stations and the other base station(s) have an adaptive array antenna.

Since an adaptive array antenna has high directivity, even if a mobile station is located in an area where channels of the above-mentioned other base station(s) generally cannot be assigned to a mobile station, it would be possible to assign channels to the mobile station.

In another aspect of the present invention, there is provided a method of making communication in multi-code CDMA where a mobile station makes communication with base stations in multi-code CDMA and an host station controls communication made between the base stations and the mobile station, the method comprising the steps of stopping a part of multi-code CDMA communication when channels of a base station with which the mobile station makes the multi-code CDMA communication are saturated, and making the thus stopped part of the multi-code CDMA communication through a channel of other base station(s).

It is preferable that the one of the base station(s) and the other base station(s) make communication with the mobile station in multi-code CDMA through an adaptive array antenna.

There is further provided a method of making communication in multi-code CDMA where a mobile station makes communication with base stations in multi-code CDMA and an host station controls communication made between the base stations and the mobile station, characterized by the steps of one of the base stations, on receipt of a request of starting communication in n codes (n is an integer equal to or greater than 2) from the mobile station, checking whether channels are short, and transmitting the result of checking to the host station, the host station receiving the result from the one of the base stations, and, if channels for n codes can be secured, instructing the one of the base stations to start making communication, whereas if channels for m codes (m is an integer smaller than n (m<n)) can be secured, instructing the one of the base stations to start making communication in m codes and further instructing other base station(s) to start making communication in (n–m) codes, and the mobile station making communication with the one of the base stations in m codes, and further making communication with the other base station(s) in (n–m) codes.

It is preferable that the method further includes the steps of the one of the base stations stopping multi-code communication made with a mobile station only in a part of codes, when the one of the base stations receives a request of starting communication from another mobile station and judges that channels is short for satisfying the request, and transmitting a request to the host station to make communication with other base station(s) in codes equal to the stopped codes, the host station, on receipt of the request to make communication with other base station(s), instructing a base station other than the one of the base stations to start making communication with the one of the base stations in codes equal to the stopped codes, and the mobile station stopping communication made with the one of the base stations in the part of codes, and starting making communication with the base station other than the one of the base stations in codes equal to the stopped codes.

It is preferable that the one of the base station(s) and the other base station(s) make communication with the mobile station in multi-code CDMA through an adaptive array antenna.

The advantages obtained by the aforementioned present invention will be described hereinbelow.

As having been explained so far, the cellular system and the method of making communication both in accordance with the present invention provide the following advantages.

The first advantage is that even if channels of a certain base station are saturated, it would be possible to make communication with the base station through channels of other base station(s). Accordingly, it would be possible to enhance an efficiency at which channels of a base station(s) are used, in multi-code CDMA communication.

The second advantage is that the number and/or volume of units for controlling channels of a base station can be reduced in dependence on channels of adjacent base stations. Hence, it would be possible to construct a base station in a smaller size in multi-code CDMA communication. Accordingly, the present invention can be applied to a cellular system such as a cellular system using pico-cells.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
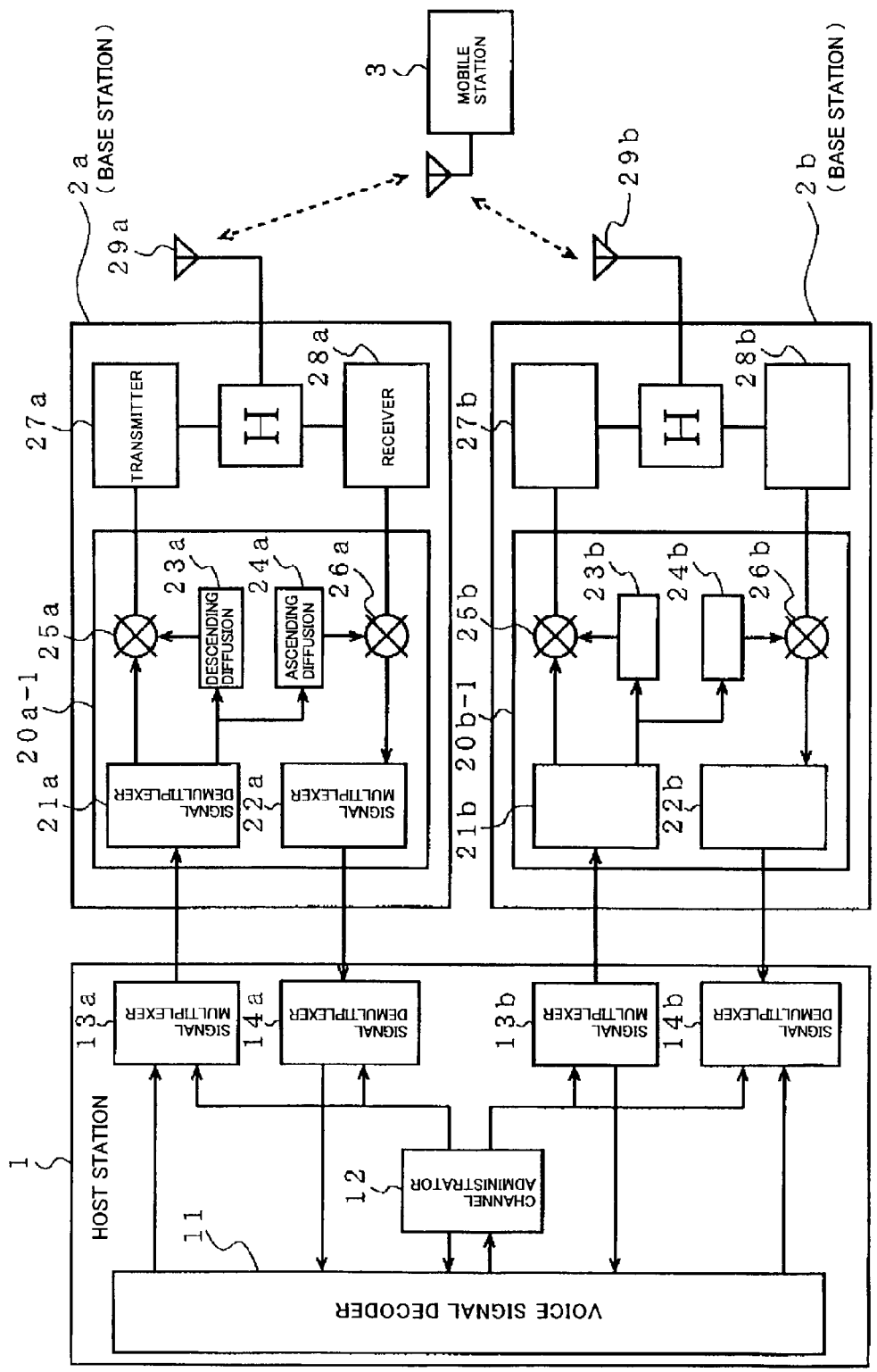
FIG. 1 is a block diagram of the cellular system operating in multi-code CDMA, in accordance with a preferred embodiment of the present invention.

FIG. 1 is a block diagram of the cellular system operating in multi-code CDMA, in accordance with a preferred embodiment of the present invention.

The cellular system in accordance with the embodiment is comprised of a first base station 2a, a second base station 2b, a mobile station 3 making multi-code CDMA communication with the first and second base stations 2a and 2b, and an host station 1 controlling communication made between the first and second base stations 2a, 2b, and the mobile station 3.

Though FIG. 1 illustrates two base stations and one mobile station for the purpose of simplification of explanation, the cellular system in accordance with the embodiment may be designed to include three or more base stations and two or more mobile stations.

The host station 1 is comprised of signal multiplexers 13a and 13b each of which multiplexes a voice signal (high-rate data signal) and a control signal to each other, and transmits the thus formed multiplexed signal to the first and second base stations 2a and 2b, respectively, signal demultiplexers 14a and 14b each of which demultiplexes a voice signal (high-rate data signal) and a control signal both transmitted from the first and second base stations 2a and 2b, from each other, a voice signal decoder 11 which is electrically connected to the signal demultiplexers 14a and 14b, and decodes a voice signal transmitted from the signal demultiplexers 14a and 14b, and a channel administrator 12 which is electrically connected to the voice signal decoder 11, the signal multiplexers 13a and 13b and the signal demultiplexers 14a and 14b, and assigns a channel to the first and second base stations 2a and 2b in accordance with a channel signal transmitted from the signal demultiplexers 14a and 14b.

The first base station 2a is comprised of a plurality of channel controllers 20a-1 to 20a-n (only the channel controller 20a-1 is illustrated in FIG. 1), a transmitter 27a which modulates signals to be transmitted from the channel controllers 20a-1 to 20a-n, a receiver 28a which demodulates signals having been transmitted from the mobile station 3, and an antenna 29a.

Each of the channel controllers 20a-1 to 20a-n is comprised of a signal demultiplexer 21a which demultiplexes a signal transmitted from the host station 1, into a voice signal (high-rate data signal) and a control signal, a descending diffusion code producer 23a which produces a descending diffusion code in accordance with the control signal transmitted from the signal demultiplexer 21a, an ascending diffusion code producer 24a which produces an ascending diffusion code in accordance with the control signal transmitted from the signal demultiplexer 21a, a diffuser 25a which diffuses and modulates the voice signal transmitted from the signal demultiplexer 21a, based on the descending diffusion code transmitted from the descending diffusion code producer 23a, a reverse-diffuser 26a which reverse-diffuses and modulates a signal transmitted from the receiver 28a, based on the ascending diffusion code transmitted from the ascending diffusion code producer 24a, and a signal multiplexer 22a which multiplexes a voice signal (high-rate data signal) and a control signal to each other, and transmits the thus multiplexed signal to the host station 1.

The second base station 2b has the same structure as the structure of the first base station 2a.

The mobile station 3 has a conventional structure, and is designed to be able to make multi-code CDMA communication with the first and second base stations 2a and 2b.

For instance, when the mobile station 3 requests the first base station 2a to make high-rate communication in n (n is an integer equal to or greater than 2) diffusion codes in an area covered by the first base station 2a, communication in n diffusion codes is generally made between the first base station 2a and the mobile station 3.

Herein, it is assumed that it is impossible to secure channels for n diffusion codes, for instance, like a case where a lot of users have already made communication through the first base station 2a. In such a case, multi-code CDMA communication is made between the mobile station and the base station as follows in the cellular system in accordance with the embodiment.

Figure 2:
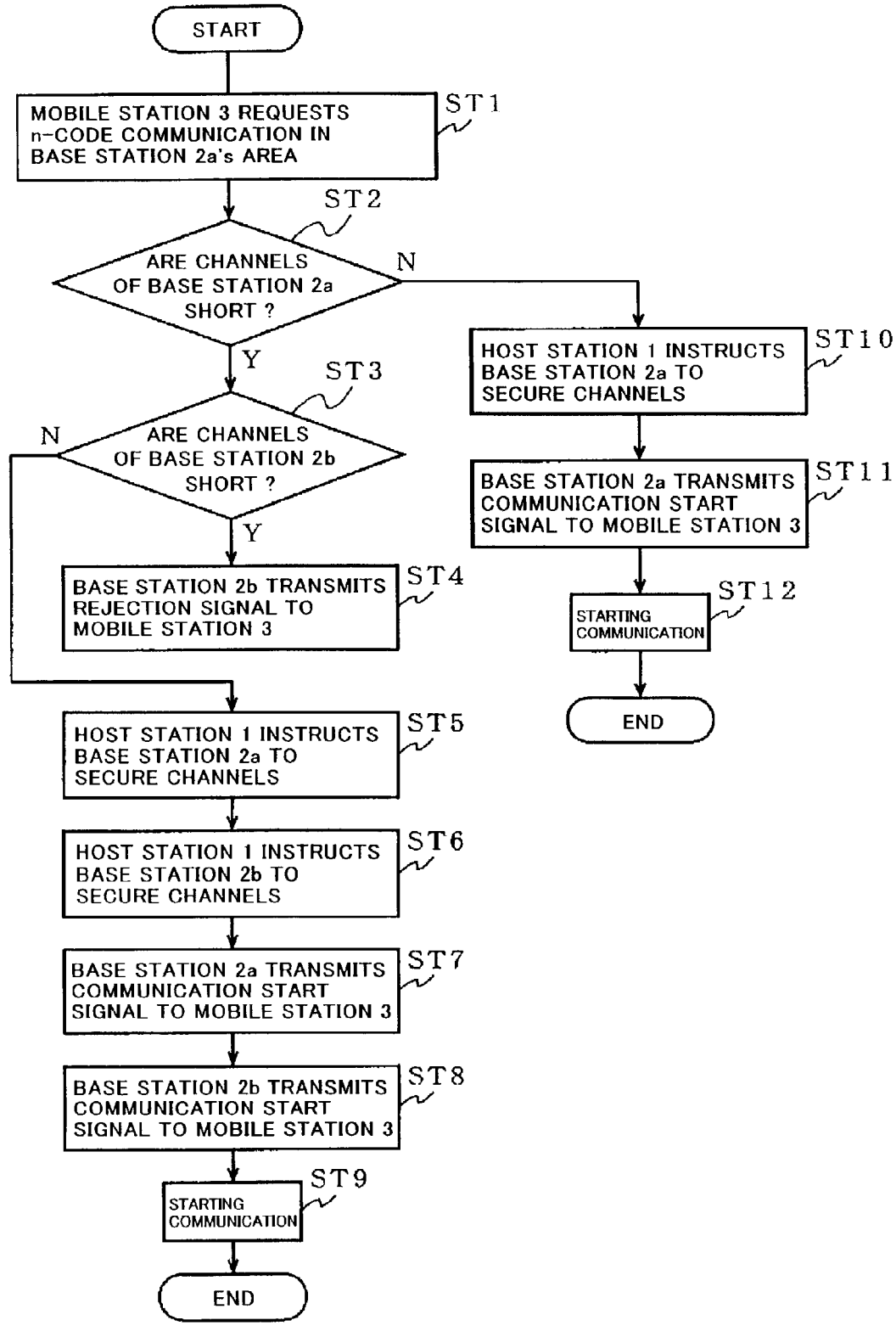
FIG. 2 is a flow chart showing the steps to be carried out by the cellular system illustrated in FIG. 1.

Hereinbelow, explanation is made with reference to the flow chart illustrated in FIG. 2.

When the mobile station 3 makes a request to make high-rate communication in n diffusion codes in an area covered by the first base station 2a, in step ST1, the host station 1 asks the first base station 2a whether channels for n diffusion codes can be secured, in step ST2.

If channels for n diffusion codes can be secured (NO in step ST2), the host station 1 instructs the first base station 2a to start making communication in n diffusion codes, in step ST10. On receipt of the instruction, the first base station 2a transmits a communication start signal to the mobile station 3, in step ST11, and thus, communication starts between the first base station 2a and the mobile station 3, in step ST12.

If channels for n diffusion codes cannot be secured (YES in step ST2), for instance, if channels only for m (m<n) diffusion codes can be secured, the host station 1 asks the second base station 2b whether channels for (n−m) codes, which could not be secured by the first base station 2a, can be secured, in step ST3.

If the second base station 2b cannot secure channels for (n−m) codes (YES in step ST3), the second base station 2b transmits a rejection signal to the mobile station 3, in step ST4.

In contrast, if the second base station 2b can secure channels for (n−m) codes (NO in step ST3), which could not be secured by the first base station 2a, the host station 1 instructs the first base station 2a to start making communication in m diffusion codes, in step ST5.

In addition, the host station 1 instructs the second base station 2b to start making communication in (n-m) diffusion codes, in step ST6.

On receipt of these instructions, the first base station 2a transmits a communication start signal to the mobile station 3, in step ST7, and the second base station 2b transmits a communication start signal to the mobile station 3, in step ST8. Then, communication starts between the mobile station and the first and second base stations 2a and 2b in assigned codes, respectively, in step ST9.

In accordance with the above-mentioned cellular system, even if the first base station 2a could not secure channels for n diffusion codes, communication can be made between the mobile station 3 and the first and second base stations 2a and 2b through channels for n codes, by using vacant channels of the second base station 2b.

In addition, it is possible to effectively use channels of base stations constituting the cellular system.

In the above-mentioned embodiment, it was assumed that the first base station 2a could not secure channels for n diffusion codes at the beginning of communication. However, though the first base station 2a could once secure channels for n codes, the first base station 2a becomes short of channels during communication. Even in such a case, as mentioned below, it is possible for the mobile station 3 to make communication with the first and second base stations 2a and 2b through channels for n diffusion codes, by using vacant channels of the second base station 2b.

Herein, for instance, it is assumed that while the first base station 2a is making multi-code CDMA communication with the mobile station 3, the first base station 2a receives a request to make communication, from another mobile station, resulting in shortage in channels.

The first base station 2a stops multi-code CDMA communication in some codes, and requests the host station 1 to change a base station in order to make communication with the second base station 2b in codes corresponding to the stopped codes.

On receipt of the request from the first base station 2a, the host station 1 instructs the second base station 2b located adjacent to the first base station 2b, to start making communication in codes corresponding to the stopped codes. As a result, the mobile station 3 stops making multi-code CDMA communication with the first base station 2a in some codes, and starts making communication with the second base station 2b in codes corresponding to the stopped codes.

As mentioned above, if the number of mobile stations with which the first base station 2a makes communication is increased, and resultingly, channels of the first base station 2a are saturated, the mobile station 3 making multi-code CDMA communication with the first base station 2a stops making communication in some codes with the first base station 2a, and starts making communication with the second base station in codes corresponding to the stopped codes.

Thus, even if the base station 2a could not secure channel for n codes during communication with the mobile station 3, it would be possible for the mobile station 3 to make communication with the first and second base stations 2a and 2b through channels for totally n codes, by using vacant channels of the second base station 2b.

In addition, it is possible to effectively use channels of base stations constituting the cellular system.

Figure 3:
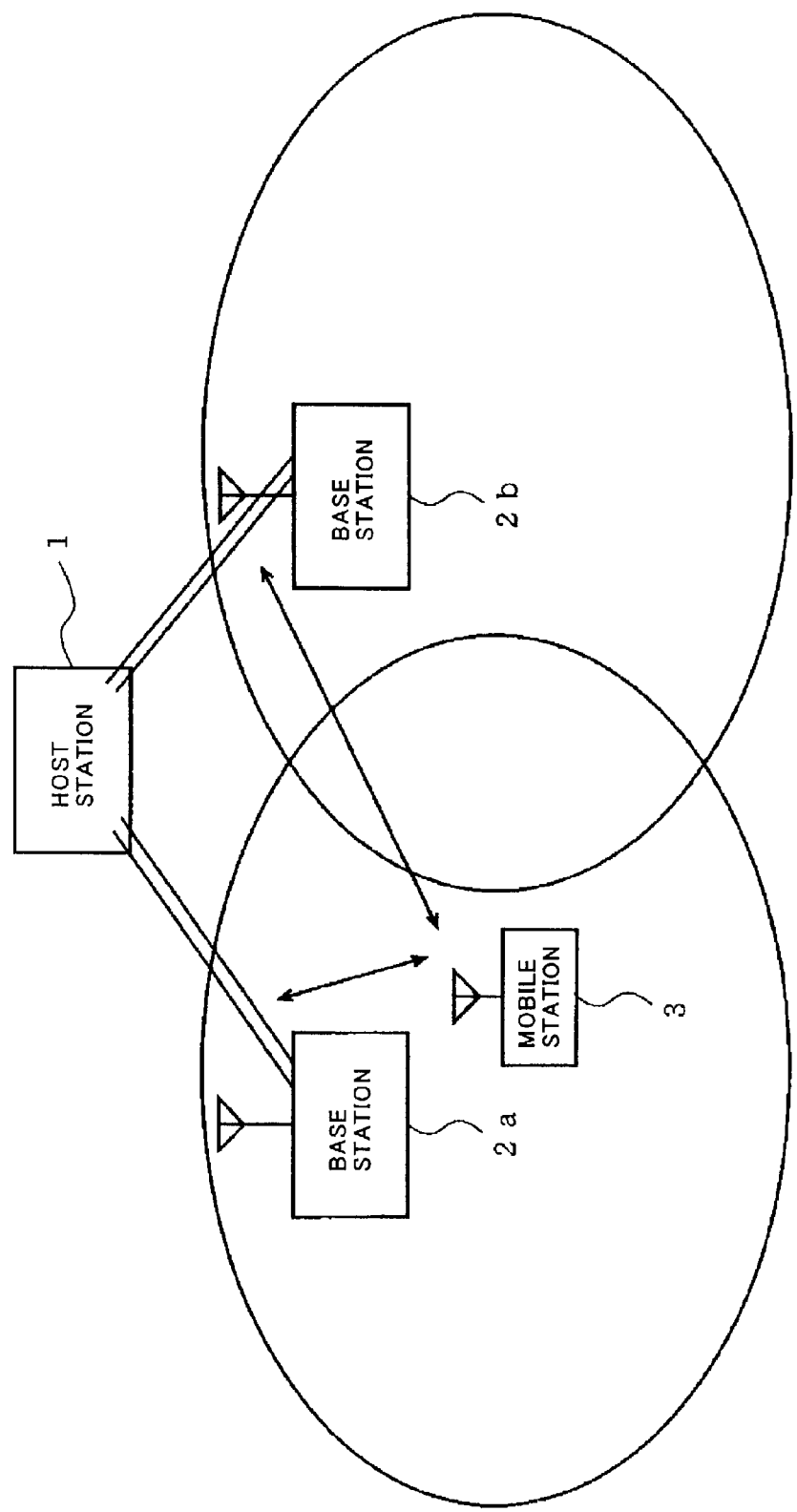
FIG. 3 illustrates the cellular system operating in multi-code CDMA, in accordance with another embodiment of the present invention.

FIG. 3 illustrates the cellular system in accordance with another embodiment.

In comparison with the cellular system illustrated in FIG. 1, the cellular system in accordance with the present embodiment is different only in the antenna 29a of the first base station 2a and the antenna 29b of the second base station 2b, and is identical in structure to the cellular system illustrated in FIG. 1 except the antennas.

Specifically, each of the first and second base stations 2a and 2b in the present embodiment is designed to include an adaptive array antenna 30a and 30b as the antenna 29a and 29b, respectively.

Since the adaptive array antennas 30a and 30b have high directivity, it would be possible for the mobile station 3 located in an area covered by the first base station 2a to be less interfered with by the second base station 2b. Hence, even if the mobile station 3 is located in an area to which the second base station 2b cannot assign a channel, as illustrated in FIG. 3, it would be possible to assign a channel to the mobile station 3 through the adaptive antenna 30b.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. A cellular system including:
   at least two base stations;
   a mobile station making communication with one or more of said base stations over a plurality of CDMA channels at the same time, each CDMA channel characterized by use of a different CDMA diffusion code; and
   a host station controlling communication made between said base stations and said mobile station over said plurality of CDMA channels,
   characterized in that when one of said base stations becomes saturated, said mobile station stops communication on one or more CDMA channels of said one base station, and begins communication on a corresponding number of CDMA channels of one or more other base stations, while still communicating throughout the communication using at least one channel of said one base station.

2. A cellular system including:
   at least two base stations;
   a first mobile station making communication with one or more of said base stations over a plurality of CDMA channels at the same time, each CDMA channel characterized by use of a different CDMA diffusion code; and
   a host station controlling communication made between said base stations and said mobile station over said plurality of CDMA channels,
   characterized in that
   one of said base stations, on receipt of a request from a second mobile station to start communication over n channels, where n is an integer equal to or greater than 2, checks whether n channels are available, and transmits the result of checking to said host station,
   said host station receives said result from said one of said base stations,
   if n channels are available, said host instructs said one of said base stations to start making communication with said second mobile station using n channels, and
   if only m channels are available, where m is an integer smaller than n, said host instructs said one of said base stations to start making communication with said second mobile station using m channels and further instructs one or more other base stations to start making communication with said second mobile station using (n-m) channels, and said second mobile station makes communication with said one of said base stations using m channels, and further makes communication with said one or more other base stations using (n-m) channels.

3. A cellular system including:
   at least two base stations;
   a first mobile station making communication with one or more of said base stations over a plurality of CDMA channels at the same time, each CDMA channel characterized by use of a different CDMA diffusion code; and
   a host station controlling communication made between said base stations and mobile stations over said plurality of CDMA channels, characterized in that when one of said base stations becomes saturated, said one of said base stations stops communication with said first mobile station on one or more channels, and said first mobile station begins communication through a corresponding number of channels of one or more other base stations, and when said one of said base stations receives a request to start communication from a second mobile station and judges that there are not enough channels available to satisfy the request, said one of said base stations stops communication with said first mobile station on a specified number of channels while remaining in communication throughout the communication with the first mobile station on at least one channel, and transmits a request to said host station to begin communication between said first mobile station and one or more other base stations using said specified number of channels, said host station, on receipt of said request, instructs a base station other than said one of said base stations to begin communication with said first mobile station using said specified number of channels, and said first mobile station stops communication with said one of said base stations on said specified number of channels, and begins communication with said base station other than said one of said base stations using said specified number of channels.

4. The cellular system as set forth in claim 2 or 3, wherein said at least two base stations have adaptive array antennas.

5. A method of making communication in multi-code CDMA where a mobile station makes communication with one or more base stations over a plurality of CDMA channels at the same time, each CDMA channel characterized by use of a different CDMA diffusion code, and a host station controls communication made between said base stations and said mobile station, characterized by the step of, said mobile station, when one of said base stations becomes saturated, stops communication on one or more CDMA channels of said one base station, and begins communication on a corresponding number of CDMA channels of one or more other base stations, while still communicating throughout the communication using at least one channel of said one base station.

6. A method of making communication in multi-code CDMA where a first mobile station makes communication with one or more base stations over a plurality of CDMA channels at the same time, each CDMA channel characterized by use of a different CDMA diffusion code, and a host station controls communication made between said base stations and mobile stations over said plurality of CDMA channels, characterized by the steps of:

one of said base stations, on receipt of a request from
a second mobile station to start communication over n channels, where n is an integer equal to or greater than 2, checking whether n channels are available, and transmitting the result of checking to said host station, said host station receiving said result from said one of said base stations, if n channels are available, said host instructing said one of said base stations to start making communication with said second mobile station using n channels, and only m channels are available, where m is an integer smaller than n, said host instructing said one of said base stations to start making communication with said second mobile station using m channels and further instructing one or more other base to start making communication with said second mobile station using (n–m) channels, and said second mobile station making communication with said one of said base stations using m channels, and further making communication with said one or more other base stations using (n–m) channels.

7. The method as set forth in claim 6, further comprising the steps of:

when said one of said base stations receives a request to start communication from
said second mobile station and judges that there are not enough channels available to satisfy the request, said one of said base stations stopping communication with said first mobile station on a specified number of channels while remaining in communication throughout the communication with the mobile station on at least one channel, and transmitting a request to said host station to begin communication between said first mobile station and one or more other base stations using said specified number of channels, said host station, on receipt of said request instructing a base station other than said one of said base stations to begin communication with said first mobile station using said specified number of channels, and said first mobile station stopping communication with said one of said base stations on said specified number of channels, and beginning communication with said base station other than said one of said base stations using said specified number of channels.

8. The method as set forth in claim 6 or 7, wherein said base stations have adaptive array antennas.

* * * * *